United States Patent [19]

Felger

[11] Patent Number: 4,788,856

[45] Date of Patent: Dec. 6, 1988

[54] METHOD AND APPARATUS FOR CHECKING DIFFERENTIAL GEAR ASSEMBLIES

[75] Inventor: Ned D. Felger, Fort Wayne, Ind.

[73] Assignee: Dana Corporation, Toledo, Ohio

[21] Appl. No.: 107,664

[22] Filed: Oct. 13, 1987

[51] Int. Cl.$^4$ .......................................... G01M 13/02
[52] U.S. Cl. ..................................... 73/118.1; 73/162
[58] Field of Search ............................. 73/118.1, 162

[56] References Cited

U.S. PATENT DOCUMENTS

| | | | |
|---|---|---|---|
| 3,298,228 | 1/1967 | Oltean et al. | 73/118.1 |
| 3,715,909 | 2/1973 | Wolanin | 73/9 |
| 4,196,620 | 4/1980 | Dapiran | 73/162 |
| 4,236,407 | 12/1980 | Alpini et al. | 73/118.1 |
| 4,356,724 | 11/1982 | Ayoub et al. | 73/118.1 |
| 4,519,242 | 5/1985 | Hofler et al. | 73/162 |
| 4,611,505 | 9/1986 | Cronin et al. | 74/607 |
| 4,698,763 | 10/1987 | Smyth | 74/877 |

Primary Examiner—Stewart J. Levy
Assistant Examiner—Robert R. Raevis
Attorney, Agent, or Firm—Marshall & Melhorn

[57] ABSTRACT

An apparatus and a method for checking differential gear assemblies during manufacture positions each gear assembly mounted in a differential housing in a tray. The differential housing is oriented by prelocators and lifted into engagement with a bottom surface of a bed plate. Proximity switches mounted in the bed plate generate a position signal which actuates a compound slide to engage a brake with an output of the gear assembly. When the brake has been applied, a drive motor is actuated and moved into engagement with an input of the gear assembly to verify lockup. The motor is increased in speed, the brake is released after a predetermined time and the gear ratio of the gear assembly is determined during revolutions of free wheeling. The steps are replaced for a reverse direction of rotation of the motor and then the motor is run at low torque to sense torque to rotate and first resistance for calculating backlash. The motor is indexed one hundred eighty degrees to determine backlash before the slide is retracted and the housing is lowered back to the starting position.

25 Claims, 5 Drawing Sheets

METHOD AND APPARATUS FOR CHECKING DIFFERENTIAL GEAR ASSEMBLIES

BACKGROUND OF THE INVENTION

The present invention concerns gear assemblies in general and, in particular, a method and apparatus for checking vehicle differential gear assemblies during manufacture.

In order to ensure the quality of completed differential gear assemblies, it is desirable to test such assemblies for various characteristics prior to shipping to the customer. For example, when the pinion nut is driven by a source of rotational power, and a braking force is applied to the differential carrier at the point where one of the axle shafts is normally coupled, the differential gear assembly should lock up. When the brake load is released, and the pinion nut continues to be rotated, the teeth on the gears in the differential gear assembly can be counted to calculate the gear ratio. When driven at low torque, the bearing preload and backlash can be measured. However, prior to the present invention, these characteristics were either checked individually or not tested at all during the manufacturing process.

For example, there is known a method and a apparatus for determining bearing preload in a gear train. An angular accelerometer is connected to a gear train so as to measure the deceleration of one of two meshed gears having backlash as the gears move independently of each other during the period after rotational power input to the gear train is disconnected when the backlash is taken up. The only resisting torque exerted on the one gear during the backlash takeup period is the drag torque of the preloaded bearing rotatably supporting it which varies directly with the bearing preload. The drag torque is determined from the measured deceleration and the bearing preload is determined from the drag torque. The gear having the faster inherent deceleration is connected to receive input power and drives the gear having the slower inherent deceleration. The input power is then disconnected to allow the faster decelerating gear to take up the backlash relative to the slower decelerating gear, and the deceleration of one of the gears is measured as the gears rotate out of contact with each other during the momentary period that the backlash is taken up. The drag torque and bearing preload of the bearings supporting the one gear are then determined from the measured deceleration.

In a conventional vehicle differential carrier assembly, a ring gear connected to the differential carrier assembly is driven by a pinion gear that is clutched to a source of rotational input power. To measure the deceleration of the differential carrier after the rotational input power has been connected and then disconnected, the input shaft of an angular accelerometer is extended through one axle shaft opening in the differential housing and is drivingly connected to the differential carrier in an area which is normally later occupied by one of the axle shafts. The pinion has a greater inherent deceleration than the carrier assembly due to the difference in the drag torques respectively exerted thereon and also the difference in rotational inertias. The difference in decelerations induces the gears to be free of each other during the momentary period after power removal so that the backlash between the gears is taken up, and the angular accelerometer measures the deceleration of the carrier assembly during this momentary period. The preload on the side bearings is determined from the measured deceleration, knowing that the only torque resisting rotation of the carrier assembly during the backlash takeup period is the drag torque exerted by the side bearings and knowing that the drag torque of the bearings varies directly with the bearing preload.

Another prior art apparatus for the dynamic testing of a pair of meshing gear wheels carries each of the gear wheels on a separate rotary support comprising pairs of aligned rotary spindles and having means for clamping the wheel under test between facing ends thereof. One spindle of each pair is axially displaceable to effect such clamping and the other spindle of each pair is connected to a rotary machine which can function both as a motor and a brake. Accelerometer transducers are mounted on one of the spindles of each pair to rotate therewith and thus with the wheels under test, the output signals from the transducers being fed via slip rings to processing circuits including means for summing and squaring them before passing the processed signals for display. The final signal is in the form of the accelerations or vibrations in a plane perpendicular to the axis of rotation of the wheel which are present as a result of tooth defects.

Another prior art process and apparatus for the quality control inspection of vehicle driving axles measures the acceleration transmitted from a vehicle driving axle comprising a differential unit and two half shafts to a support structure as the axle is driven against a resisting torque. Transmitted acceleration is measured in terms of its three-mutually-orthogonal components using accelerometers which output electrical signals to a processing unit. The unit processes these signals to derive comparison parameters which are then compared with reference values, to identify certain faults which may be present in components of the differential unit. The anomalies detectable by the inspection process include localized defects in the teeth of the driving and driven gears which cause cyclic discontinuous transmission of drive and "jolts", eccentricity of mounting of the driving and driven gears which causes a cyclic variation in the surface of contact between the teeth of the gears, irregular engagement between the teeth of the driving and driven gears, and operational defects of the bearings supporting the two gears.

A prior art automatic testing apparatus tests the circular spacing of gears, the deviations in gear concentricity, tooth thickness and tooth gap. The testing of circular spacing is accomplished in only one revolution simultaneously for both the right and left tooth flanks of the gear, and the measurement values thus obtained can be used as well for ascertaining the deviations in gear concentricity, tooth thickness and tooth gaps. During the testing operation, the gear is caused to rotate continuously in one direction from its own power source, and a slide on the frame of the apparatus is displaceable by a drive mechanism substantially radially toward the gear and back away from it for performing the individual testing operations. The slide has two measuring feelers supported pivotally on it, which are movable along with the gear counter to spring force and which cooperate with the preferably inductive transducer. The measuring feelers each point toward the same flank of two adjacent teeth in the vicinity of the pitch circle of the gear. Means are provided for applying the measuring feelers, under spring force, to the tooth flanks after the feelers have been driven into the tooth gaps and for moving them away from the tooth flanks, counter to spring force, after the testing operation. The first measuring feeler is embodied as a reference feeler and is connected with switching means by which, at a predetermined pivoted position of the feeler, the pickup or emission of a measurement value from the second feeler is brought about on the one hand and by which on the other hand the retraction of the measuring feelers out of the teeth and their re-insertion, retarded in an adjustable manner, into the teeth are controllable by means of the appropriate switching of the slide drive. A third measuring feeler which cooperates with a preferably inductive transducer is disposed on the slide in the vicinity of the pitch circle of the gear, being positioned for that purpose for the edge opposite the first or second measuring feeler. Thus, it is possible to scan the tooth flank opposite the first or second feeler, and to evaluate the measurement value thus ascertained for the purpose of ascertaining the spacing of the tooth flanks located opposite the first and second measuring feelers.

SUMMARY OF THE INVENTION

The present invention is concerned with a method and apparatus for testing differential gear assemblies during production. Each gear assembly is mounted in a differential housing which is carried by a tray on a conveyor into the checking apparatus. The differential housings are mounted in the trays with the pinion nut extending downwardly and an open end of the housing facing upwardly. An outer surface of the housing is engaged by a prelocator which orients the housing with respect to a bed plate mounted on the upper end of the machine. The tray and housing are raised such that the housing engages a downwardly facing surface of the bed plate and locator pins extending therefrom. A compound slide is actuated to move a collet through a carrier bore in the housing and into engagement with a differential case. A brake load is applied through the collet and a drive motor is actuated to a first speed. The drive motor is raised toward the lower end of the housing until a socket drive engages the pinion nut and lockup is verified.

The motor is then actuated to a higher second speed and the brake load is applied for a predetermined time before it is released. The constant gears of the input and output are counted for five revolutions of free wheeling and the counts are utilized to calculate the gear ratio. The direction of the motor is then reversed and the steps to verify lockup and obtain the gear ratio are repeated for the opposite direction of rotation.

The motor is run at low torque and the torque to rotate and first resistance are sensed. Backlash is calculated and the motor is indexed one hundred eighty degrees to sense first resistance in the opposite direction. Backlash is again calculated. If all of the characteristics are within the associated ranges, the compound slide is retracted, the tray is lowered and the tray with the housing is removed from the checking machine onto another conveyor. If any of the characteristics are out of limits, the operator of the machine is alerted and the checking process is stopped.

DESCRIPTION OF THE PREFERRED EMBODIMENT

Figure 1:
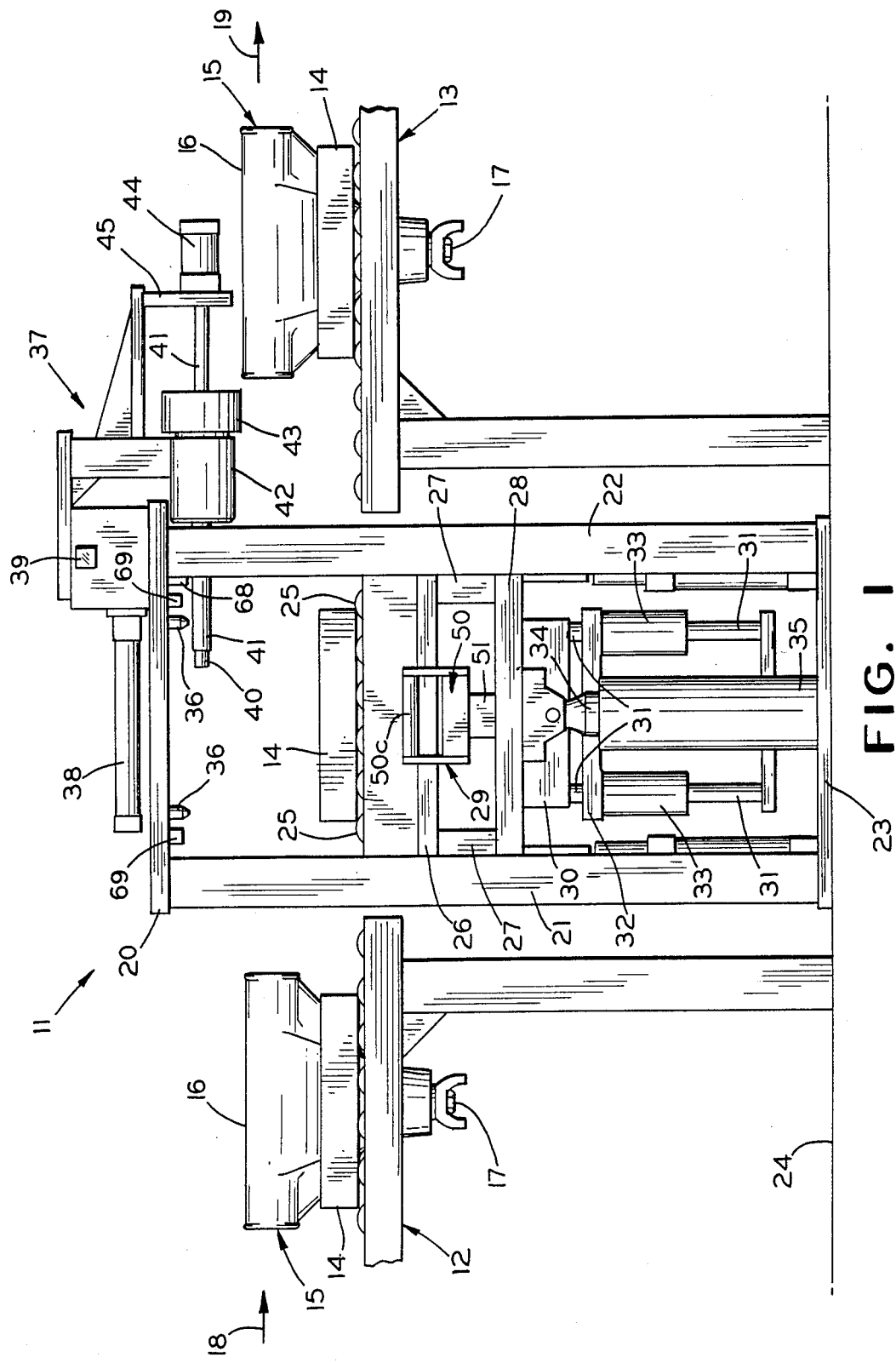
FIG. 1 is a front elevational view of a checking apparatus according to the present invention installed in a differential gear assembly line.

There is shown in FIG. 1 a differential gear assembly checking apparatus or machine 11 according to the present invention installed in a differential gear assembly production line. The machine 11 is installed between an entrance conveyor 12 and an exit conveyor 13 which support and permit movement of trays 14 into and out of the checking machine 11 respectively. For example, a tray 14 is supported on the rollers of the conveyor 12. The tray 14 maintains a differential housing 15 in a position wherein an open end 16 faces generally upwardly and a pinion nut 17 extends from the opposite end of the housing 15 in a generally downward direction. The tray 14 and the differential housing 15 are moveable along the conveyor 12 in the direction of an arrow 18 into the checking machine 11. A second tray 14 is shown positioned in the checking machine 11, but a differential housing is not shown in this tray in order not to obscure various details of the checking machine 11. After the checking process has been completed, the tray 14 and housing 15 are removed from the machine 11 in the direction of an arrow 19 on the conveyor 13.

The checking machine 11 includes a bed plate 20 attached along a front edge at the upper ends of generally vertically extending legs 21 and 22. The lower ends of the legs 21 and 22 are attached to a base plate 23 which rests upon a suitable ground surface such as a floor 24 of a manufacturing building. The legs 21 and 22 represent another pair of similar legs (not shown) attached to a rear edge of the bed plate 20.

As each of the trays 14 is moved into the checking machine 11, it rests upon rollers 25 rotatably mounted in and extending above an upper surface of a generally horizontally extending block 26. A similar block and roller assembly (not shown) is provided at the rear of the checking machine 11 and the rollers cooperate to support opposite edges of the trays 14. Opposite ends of the block 26 are attached to a pair of downwardly extending supports 27 which in turn are attached to an upper surface of a lift frame 28. Mounted on the upper surface of the frame 28 is a prelocator 29 which will be explained in more detail in connection with FIG. 4.

The lift frame 28 is attached to an upper surface of an upper block 30. A pair of rods 31 extend downwardly from a lower surface of the block 30 and through apertures formed in a lower block 32 and are retained in bushings mounted in a pair of bush plates 33 attached to a lower surface of the lower block 32. As the block 26, the lift frame 28 and the upper block 30 are raised and lowered, the vertical travel is guided by a pair of guide bars attached to opposite sides of the upper block 28. Only one of the guide bars 34 is shown in FIG. 1 and has an upper end pivotally attached to the lift frame 28. A lower end of the guide bar 34 extends into a guide block 35 mounted on an upper surface of the base plate 23.

The guide block 35 includes bushings (not shown) for slidably retaining the guide bar 34 and a helical compression spring (not shown) for biasing the guide bar in the upward direction.

A pair of guide pins 36 extend downwardly from opposite ends of the lower surface of the bed plate 20. When the lift frame 28 is raised to its uppermost position, an upper edge of the housing 16 contacts the downwardly facing surface of the bed plate 20 and engages the guide pins 36 to precisely locate the housing for the subsequent operations. A compound slide 37 is mounted on an upper surface of the bed plate 20 and includes a pair of hydraulic cylinders 38 and 39 for moving a collet 40 and associated drive shaft 41 into and out of an aperture in the differential housing 15. The drive shaft 41 extends through a bearing housing 42 and a brake assembly 43 and is coupled to a hydraulic cylinder 44 mounted on a bracket 45 attached to the compound slide 37.

Figure 2:
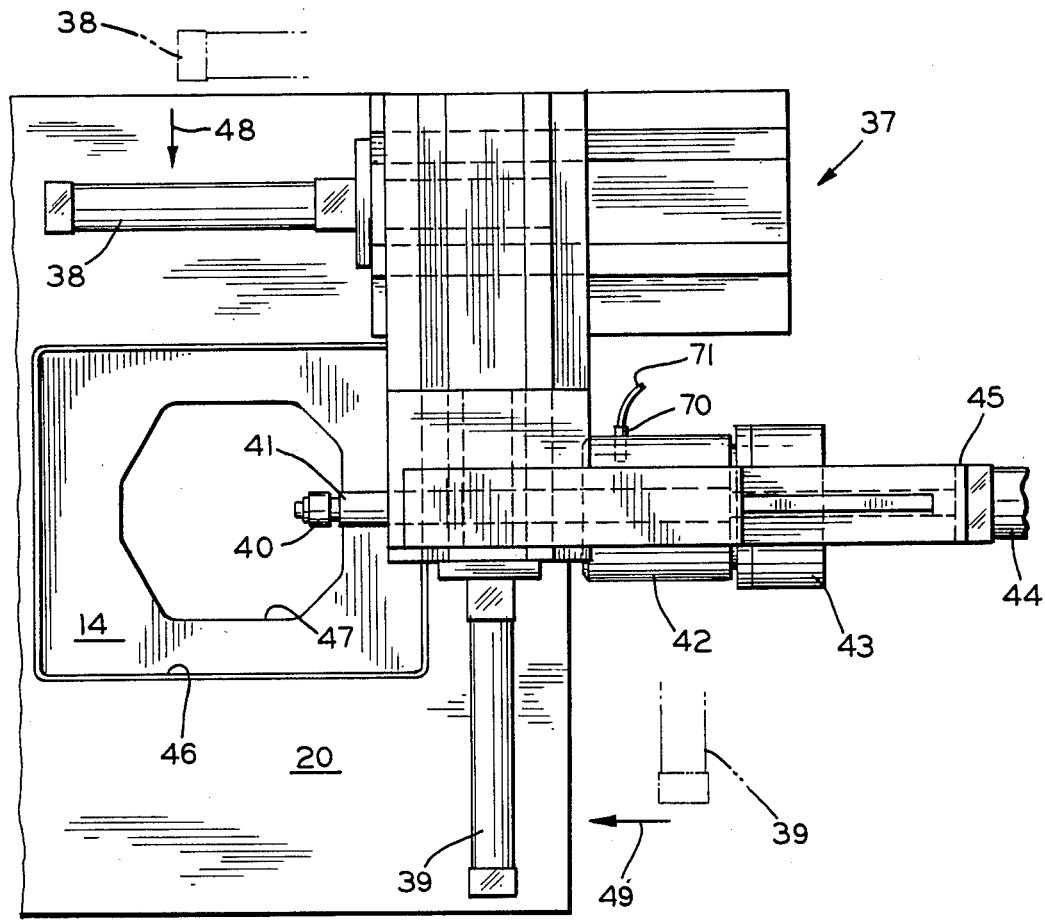
FIG. 2 is an enlarged fragmentary top plan view of the checking apparatus shown in FIG. 1.

Referring now to FIG. 2, the top plate 20 has a centrally located aperture 46 formed therein for viewing the open end 16 of a differential housing 15 and associated differential gear assembly which is retained in an aperture 47 formed in a generally horizontally extending wall of the tray 14. The aperture 47 is shaped to retain the housing and gear assembly in a predetermined orientation with respect to the plane of the bed plate 20. Under the operation of the hydraulic cylinders 38 and 39, the compound slide 37 moves simultaneously in the directions of arrows 48 and 49 to position the collet 40 and drive shaft 41 at the location shown.

Figure 4:
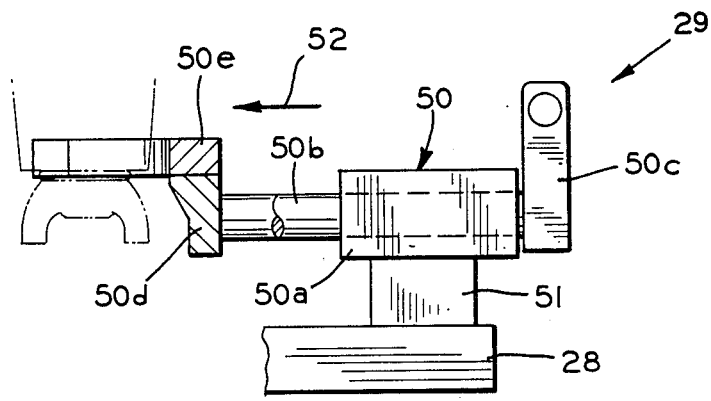
FIG. 4 is an enlarged side elevational view of the prelocator shown in FIG. 1.

Referring now to FIGS. 1 and 4, the prelocator 29 includes a block 50 mounted on a support 51 attached to an upper surface of the lift frame 28. The block 50 includes a base 50a which slidably retains a pair of generally horizontally extending rods 50b. An outer end of each of the rods is attached to a handle 50c which is adapted to be grasped by a human hand. An inner end of the rods 50b is attached to a bracket 50d which in turn is attached to a generally U-shaped stop block 50e. The prelocator 29 is moveable in the direction of an arrow 52 into engagement with a lower end of the differential housing 15 to prelocate the housing 15 with respect to the lift frame 28.

Figure 3:
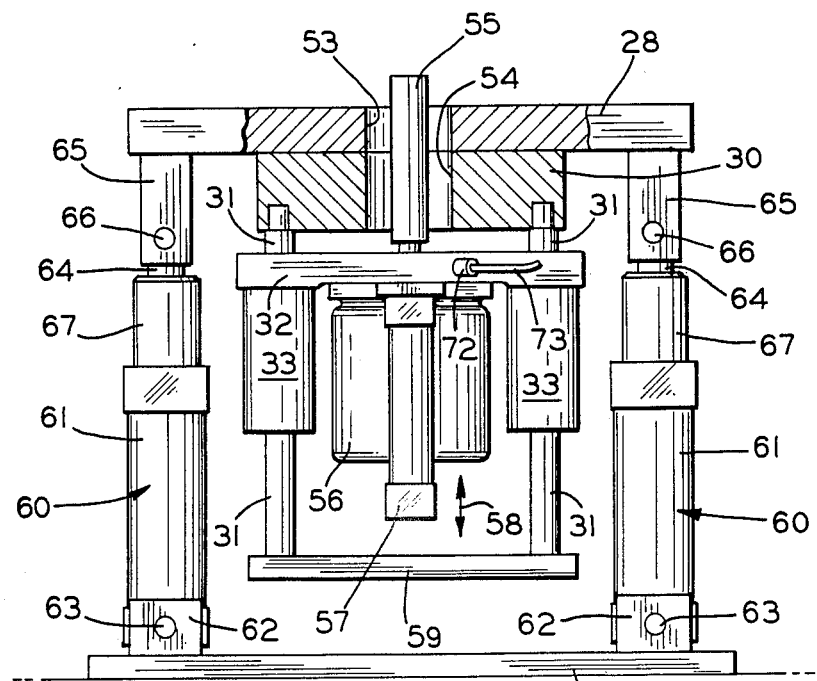
FIG. 3 is an enlarged side elevational view in partial cross section of the supporting and drive motor portion of the checking apparatus shown in FIG. 1.

The lift frame 28 and the upper block 30 each have a central aperture, 53 and 54 respectively, formed therein through which a socket drive 55 and associated couplings extend as shown in FIG. 3. The socket drive and couplings 55 are attached to an end of an output shaft of a hydraulic motor 56 which is attached to the lift frame 28. A hydraulic cylinder 57 is coupled between the lower block 32 and the upper block 30 for raising the hydraulic motor 56 and the socket drive and couplings in the direction of an arrow 58 into engagement with the pinion nut 17 on a differential housing 15. The motor 56, the cylinder portion of the hydraulic cylinder 57, the lower block 32 and the bush plates 33 move as a unit along the guide rods 31. The lower end of each guide rod 31 is attached to a plate 59 which maintains the proper spacing between the guide rods.

The lift frame 28 and all of the elements attached thereto is raised and lowered by a pair of hydraulic cylinders 60. Each of the hydraulic cylinders 60 has an outer housing 61 having one end attached to an anchor block 62 at a pivot point 63. Each of the anchor blocks 62 is attached to an upper surface of the base plate 23. Extending from an opposite end of the housing 61 is an end of an actuating rod 64 which is pivotally attached to a bracket 65 at a pivot point 66. Each of the brackets 65 is attached to a lower surface of the lift frame 28. Each of the hydraulic cylinders 60 is oriented with its longitudinal axis in a generally vertical direction. The hydraulic cylinders 60 are attached to the lift frame 28 at the center point of opposite ends for raising a differential housing 15 into contact with the bed plate 20 and lowering the housing back to the level of the exit conveyor 13 when the checking of the differential gear assembly has been completed. A stop block 67 is mounted on an upper end of each of the housings 61 in order to provide the proper reference point for the lower position of the lift frame 28. Thus, the lower ends of the brackets 65 will engage the upper surfaces of the stop blocks 67 in the fully retracted position.

Referring again to FIG. 1, it is desirable to know that the differential housing 15 is in the proper position before the checking process is begun. As stated above, the prelocator 29 and the guide pins 36 engage the differential housing 15 to assist in locating the housing at a predetermined position with respect to the plane of the bed plate 20. In addition, a prelocator block 68 can be attached to a lower surface of the bed plate 20 and extend downwardly to engage an outer surface of the differential housing 15 to properly position the housing. A pair of proximity switches 69 can be mounted on or in the bed plate 20 adjacent the guide pins 36 for detecting the presence of the differential housing 15.

There is shown in FIG. 2 a sensor or pickup 70 mounted in the bearing housing 42 for sensing the rotation of the drive shaft 41. The pickup 70 can be of any conventional type and typically includes a cable 71 on which is generated an output signal representing increments of rotation of the drive shaft 41.

Similarly, as best shown in FIG. 3, a sensor or pickup 72 is mounted in the lower block 32 for sensing the rotation of the drive shaft of the hydraulic motor 56. The pickup 72 generates signals on an attached cable 73 representing increments of rotation of the motor drive shaft. Of course, the pickups 70 and 72 can be mounted in any suitable location for generating an accurate representation of the incremental rotation of the input side of the differential gear assembly relative to the output side of the differential gear assembly for calculating the gear ratio.

Figure 5:
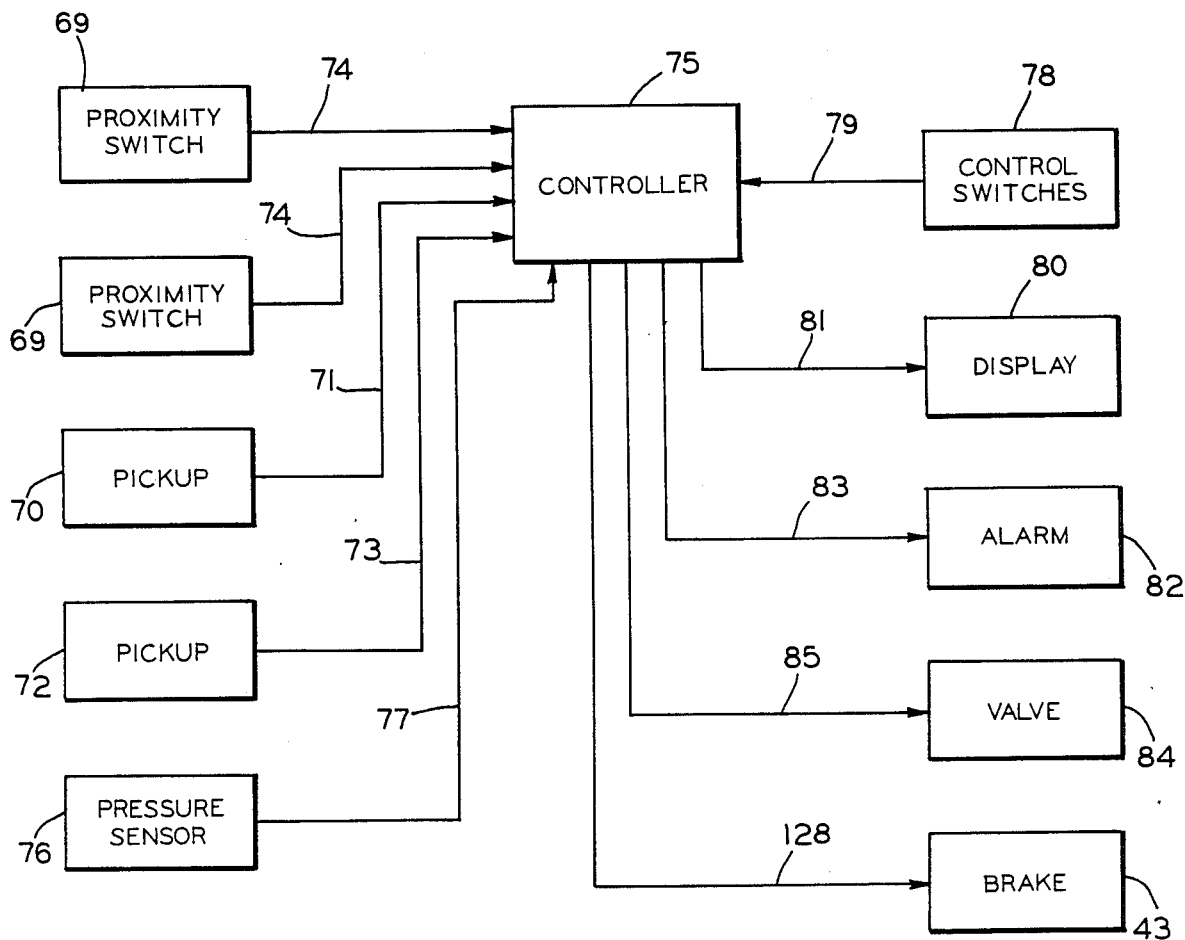
FIG. 5 is a block diagram of a control system for the checking apparatus of FIG. 1.

As shown in FIG. 5, the proximity switches 69 are each connected by a cable 74 to inputs of a controller 75. Similarly, the pickup 70 is connected by the cable 71 and the pickup 72 is connected by the cable 73 to the controller 75. A pressure sensor 76 is connected by a line 77 to an input of the controller 75. The pressure sensor 76 represents one of a number of such devices each of which can be utilized to monitor the pressure of the hydraulic fluid being supplied to one of the hydraulic cylinders or the hydraulic motor 56. For example, the pressure sensor 76 could be utilized to measure the hydraulic pressure being supplied to the hydraulic motor 56 to determine the bearing preload. When combined with the information from the output signal of the pickup 72 as to the rotational position of the hydraulic motor the controller can be utilized to determine the gear backlash.

A plurality of control switches 78 can be connected to the controller 75 by one or more cables 79 for generating input signals. For example, signals to start the checking cycle and to stop the checking machine can be provided. Additional switches can be provided for manually controlling each of the hydraulic elements of the checking machine 11 for initial setup and maintenance and repair purposes. The controller 75 can be connected to one or more display devices 80 by one or more cables 81. The display devices 80 can include visual indicators showing the operation of various elements of the checking machine 11 and digital readouts for various characteristics being measured. The controller 75 is also connected to one or more alarm devices 82 by one or more cables 83. The alarm devices can include manual devices such as bells and lights and automatic devices for actuating various elements of the machine 11. The controller 75 is connected to one or more electrically actuated hydraulic valves 84 by one or more cables 85. The valves 84 control the flow of hydraulic fluid to and from the hydraulic cylinders 38, 39, 44, 57, and 60, and the hydraulic motor 56. The controller 75 can be any suitable well known commercially available device including a programmed general purpose computer.

Figure 6:
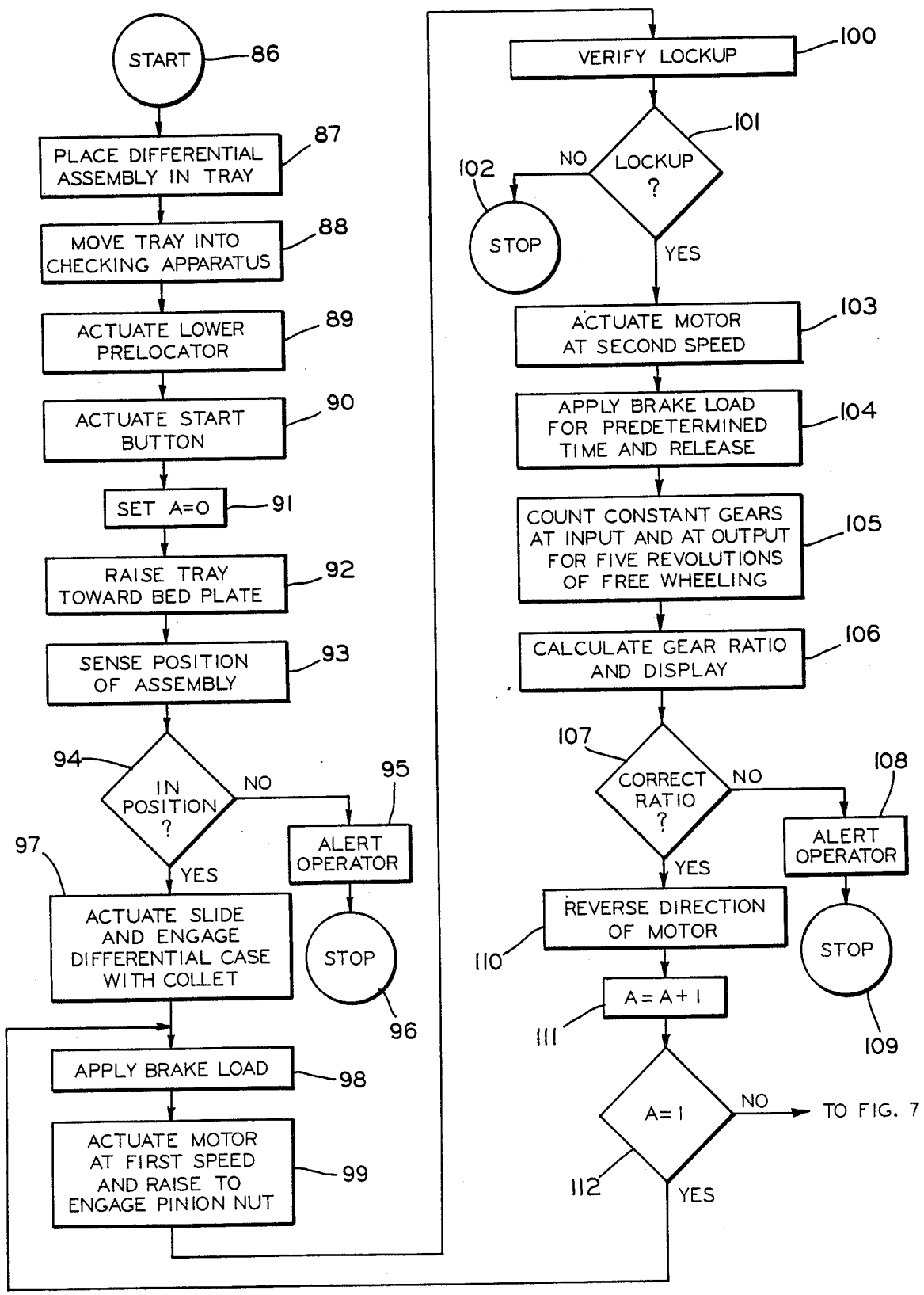
FIGS. 6 and 7 a flow diagram of the process for checking differential gear assemblies according to the present invention.
Figure 7:
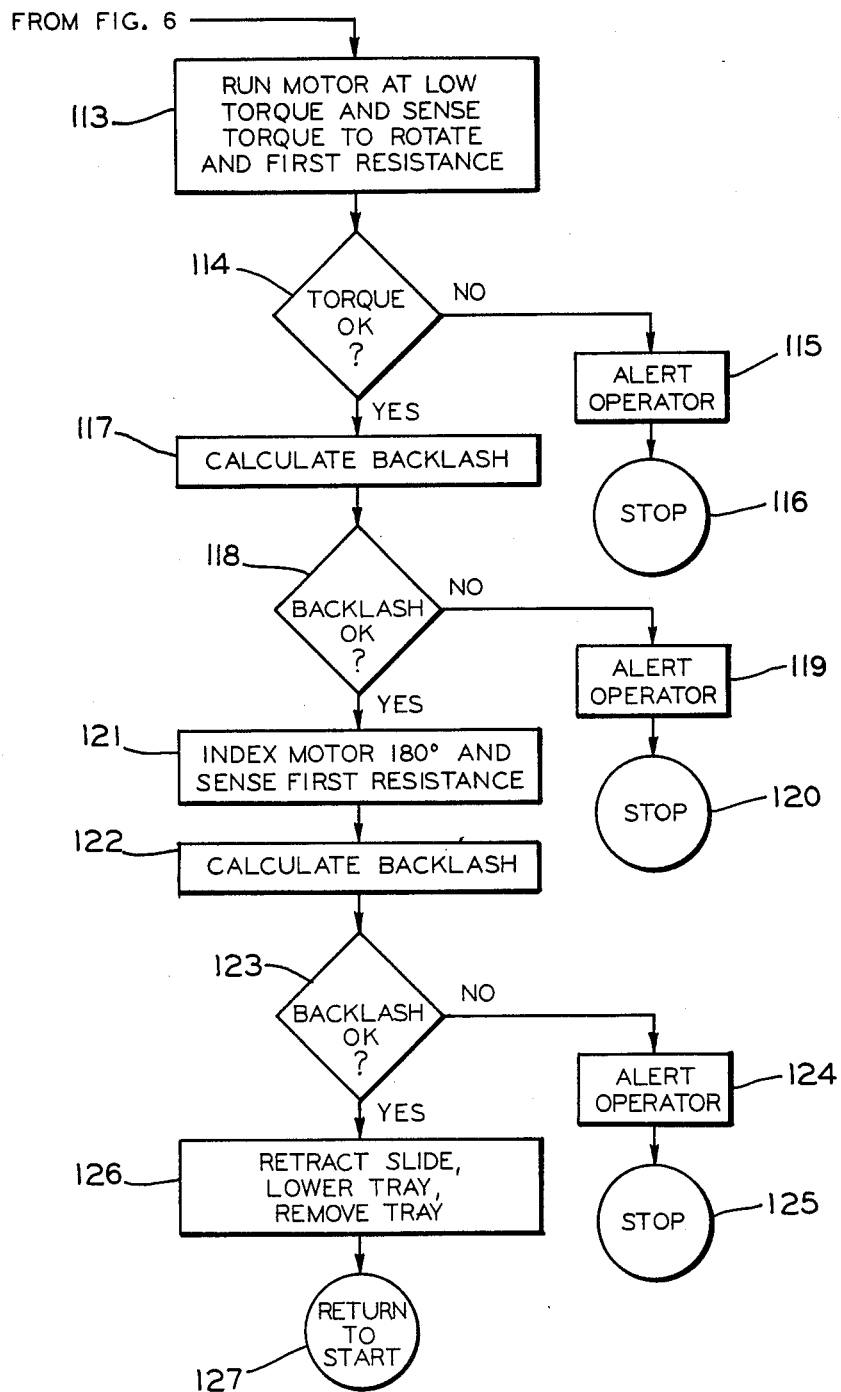

There is shown in FIGS. 6 and 7 a flow diagram of the method of testing differential gear assemblies according to the present invention. The method begins at a circle 86 and enters a first step 87 "place differential assembly in tray". A next step 88 is "move tray into checking apparatus". At a next step 89, "actuate lower at prelocator" is performed to precisely locate the differential housing 15 carried by the tray 14 for contact with the lower surface of the bed plate 20 by manually actuating the prelocator 29. When the housing has been properly located, a step 90 "actuate start button" is performed. The steps 87 through 90 are typically performed manually by a machine operator, but could be automated.

The controller 75 now sets a value for a variable "A" in a step 91 "set A=0". The variable "a" is a counter utilized to indicate when the lockup and gear ratio functions have been performed for both directions of rotation. Next, a step 92 "raise tray toward bed plate" is performed by actuating the valves connected to the hydraulic cylinders 60. The proximity switches 69 sense the presence of the differential housing 15 and generate signals to the controller 75 in a step 93 "sense position of assembly". The controller 75 then enters a decision point 94 where it determines whether it has received signals on both of the lines 74 representing the presence of a differential housing. If the controller determines that the proper signals have not been received, it branches at "NO" to a step 95 "alert operator" when one of the alarm devices 82 is actuated. Either the operator manually, or the controller automatically, can then stop the checking process at a circle 96.

If the proper signals were received in step 93, the controller branches at "YES" from the decision point 94 to a step 97 "actuate slide and engage differential case with collet". Thus, the controller signals the appropriate valves 84 to actuate the hydraulic cylinders 38 and 39 to move the compound slide 37 into position with respect to the differential housing 15. The hydraulic cylinder 44 is then actuated to engage the collet 40 with the differential gear assembly through the carrier bore of the differential housing. A step 98 "apply brake load" is performed by the controller 75 by actuating the brake 43 over a line 128 (FIG. 5). At a step 99 "actuate motor at first speed and raise to engage pinion nut" the controller 75 actuates on a of the valves 84 to rotate the hydraulic motor 56 at a first predetermined speed such as one hundred fifty rpm. The controller 75 then actuates another one of the valves 84 to actuate the hydraulic cylinder 57 which raises the lower block 32 to engage the socket drive and couplings 55 with the pinion nut 17. Since the brake is actuated, the differential gear assembly should lock up. Typically, the machine operator visually confirms lockup in a step 100 "verify lockup" and utilizes the control switches 79 to signal his observation to the controller 75. Alternatively, means can be provided to automatically verify lockup such as by utilizing the pickup 72 to determine that the hydraulic motor 56 is not rotating.

The controller next enters a decision point 101 "lockup ?". If the differential gear assembly is not locked up. The controller branches at "NO" and the checking process ends at a circle 102 "stop" either manually or automatically. If lockup is observed, the controller branches at "YES" to a step 103 "actuate motor at second speed" wherein the hydraulic motor 56 is increased in speed, typically to twelve hundred rpm. In either case, the brake is released after the decision point 101. The controller performs a step 104 "apply brake load for predetermined time and release" by actuating the brake 43 for a predetermined time such two seconds and then releasing the brake to allow the brake assembly to run in a free wheeling state. The controller executes step 105 "count constant gears at input and at output for five revolutions of free wheeling" by sensing the signals from the pickups 70 and 72 to determine the number of revolutions of the gears at both the input and output of the differential gear assembly. The controller executes a step 106 "calculate gear ratio and display". The calculated gear ratio can be displayed in digital form by one of the displays 80. The calculated ratio is then compared with a range of ratios either manually by the operator or automatically by the controller 75. The controller enters a decision point 107 "correct ratio?". If the gear ratio is not correct, the controller exits at "NO" and enters a step 108 "alert operator" whereby one of the alarms 82 is actuated. Either the operator manually, or the controller automatically, causes the machine 11 to stop at a circle 109 "stop".

If the correct ratio has been sensed, the controller branches at "YES" to a step 110 "reverse direction of motor". The controller enters a step 111 "A=A+1" wherein the variable "A" a decision point "A=1". If the differential gear assembly in the checking machine 11 has only been tested for the first direction of rotation, the variable "A" will have a value of one and the controller will branch at "YES" back to step 98 to repeat the testing procedure for the opposite direction of rotation to verify lockup and the gear ratio.

If the differential gear assembly has been tested in both directions of rotation, the variable "A" will equal two and the controller will branch at "NO" to a step 113 "run motor at low torque and sense torque resistance". As stated above, the controller 75 will receive signals from the pressure sensor 76 and the pickup 72. The controller enters a decision point 114 "torque o.k.?". If the torque is not within a predetermined range, the controller branches at "NO" to a step 115 "alert operator" and one of the alarms 82 is actuated. The checking machine 11 is stopped at a circle 116 "stop". If the torque is in the desired range, the controller branches at "YES" to a step 117 "calculate backlash". The controller 75 checks to determine whether the backlash is within a predetermined range at a decision point 118. If the backlash is not within the range, the controller branches at "NO" to a step 119 "alert operator" wherein one of the alarms 82 is actuated. The operation of the machine 11 is then stopped at a circle 120 "stop".

If the backlash is within the predetermined range, the controller branches at "YES" to a step 121 "index motor 180° and sense first resistance". The controller actuates the hydraulic motor 56 and senses the rotation utilizing the pickup 72 to index the motor one hundred eighty degrees. The controller senses and determines the backlash at a step 122 "calculate backlash". If the backlash is not within the predetermined limits, the controller branches at "NO" from a decision point 123 "backlash o.k.?" to a step 124 "alert operator" wherein one of the alarms 82 is actuated. The machine 11 then is stopped at a circle 125 "stop". If the backlash is acceptable, the controller enters a step 126 "retract slide, lower tray, remove tray". The hydraulic cylinders 44, 38, 39, 57 and 60 are actuated to retract the compound slide 37 and lower the tray 14 supported on the rollers 25. The tray 14 and the differential housing 15 are then removed from the checking machine 11 onto the exit conveyor 13 either manually or automatically. The controller enters a circle 127 "return to start" to return to the circle 86 "start" and repeat the checking process for another differential gear assembly.

In accordance with the provisions of the patent statues, the present invention has been described in what is considered to represent its preferred embodiment. However, it should be noted that the invention can be practiced otherwise than as specifically illustrated and described without departing from its spirit or scope.

What is claimed is:

1. An apparatus for checking a gear assembly, comprising:
   means for retaining a gear assembly in a predetermined orientation with respect to a plane referenced to said means for retaining;
   means responsive to said gear assembly in a predetermined position with respect to said plane for generating a position signal;
   brake means responsive to said position signal for applying a brake load to said gear assembly to prevent rotation of at least one gear in said gear assembly; and
   drive means responsive to said position signal for engaging an input of said gear assembly at a first predetermined speed of rotation of said drive means.

2. The apparatus according to claim 1 wherein said means for retaining includes a tray having an aperture formed in a wall thereof for receiving and retaining the gear assembly in said predetermined orientation.

3. The apparatus according to claim 1 wherein said means for retaining includes a lift frame for supporting said gear assembly and a prelocator means slidably mounted on said lift frame for engaging said gear assembly at said predetermined orientation.

4. The apparatus according to claim 3 wherein said prelocator means includes a block extending therefrom for engaging a portion of said gear assembly at said predetermined orientation.

5. The apparatus according to claim 1 wherein said means for retaining includes a bed plate having at least one guide pin extending therefrom for engaging a portion of said gear assembly at said predetermined orientation.

6. The apparatus according to claim 1 wherein said means for generating a position signal includes at least one proximity switch located adjacent said predetermined position.

7. The apparatus according to claim 1 wherein said means for retaining includes a bed plate having at least one guide pin extending therefrom for engaging a portion of said gear assembly at said predetermined orientation and wherein said means for generating a position signal includes at least one proximity switch positioned adjacent said guide pin.

8. The apparatus according to claim 1 wherein said brake means includes an electrically actuated brake coupled to a drive shaft for engaging said gear assembly.

9. The apparatus according to claim 8 wherein said brake means includes a collet coupled to an end of said drive shaft for engaging said gear assembly and a hydraulic cylinder coupled to an opposite end of said drive shaft for actuating said collet.

10. The apparatus according to claim 1 wherein said brake means includes a compound slide having a pair of hydraulic cylinders for actuating said slide in at least two different directions and a brake mounted on said compound slide for engaging said gear assembly in at least one position of said compound slide.

11. The apparatus according to claim 1 wherein said drive means includes a hydraulic motor and means for coupling an output shaft of said hydraulic motor to said gear assembly.

12. The apparatus according to claim 1 wherein said drive means includes an upper block, a lower block, said upper and lower blocks being coupled to said means for retaining, a hydraulic drive motor attached to said lower block, and means for moving said lower block relative to said upper block to engage said drive motor with said gear assembly.

13. The apparatus according to claim 12 wherein said means for moving includes a hydraulic cylinder connected between said upper block and said lower block.

14. The apparatus according to claim 12 wherein said means for moving includes a pair of rods each having one end attached to said upper block and an opposite end attached to a plate, said rods each extending through a separate bush plate attached to said lower block.

15. The apparatus according to claim 1 including means for sensing rotation of an input and an output of said gear assembly.

16. The apparatus according to claim 15 wherein said means for sensing rotation includes a first pickup positioned adjacent said drive means for sensing rotation of said input to said gear assembly and a second pickup positioned adjacent said brake means for sensing rotation of said output of said gear assembly.

17. The apparatus according to claim 1 including a controller having at least one input connected to said means responsive to said gear assembly for receiving said position signal, having a first output connected to said brake means for controlling the application of said brake load to said gear assembly, and having a second output connected to said drive means for controlling the speed of rotation of said gear assembly.

18. The apparatus according to claim 17 wherein said controller is connected to a first pickup adjacent said drive means for sensing the rotation of an input of said gear assembly and a second pickup means adjacent said brake means for sensing rotation of said output of said gear assembly.

19. The apparatus according to claim 18 wherein said controller has an output connected to at least one display device and another output connected to at least one alarm device for actuating said display device and said alarm device with information associated with said gear assembly.

20. A method of checking a gear assembly comprising the steps of:
   a. positioning a gear assembly in a predetermined orientation with respect to a plane referenced to a means for retaining the gear assembly;
   b. sensing said gear assembly in a predetermined position with respect to said plane and generating a position signal;
   c. engaging a brake with said gear assembly in response to said position signal;
   d. actuating said brake to prevent rotation of at least one gear in said gear assembly;
   e. engaging a rotating drive means with an input of said gear assembly; and
   f. checking said gear assembly for lockup.

21. The method according to claim 20 wherein said step e is performed at a first predetermined speed of rotation of said drive means and including subsequent steps of:
   g. increasing the speed of rotation of said drive means to a higher second predetermined value;
   h. applying said brake for a predetermined time;
   i. releasing said brake and allowing said brake to free wheel for a predetermined number of revolutions of said gear assembly; and
   j. counting constant gears during said step i. to determine a gear ratio for said gear assembly.

22. The method according to claim 21 including a step of reversing the direction of rotation of said drive means and repeating said steps d. through j.

23. The method according to claim 21 including subsequent steps of:
   k. operating said drive means at a relatively low torque value and sensing torque to rotate and first resistance; and
   l. determining backlash for said gear assembly.

24. The method according to claim 23 including a step of indexing said drive means one hundred eighty degrees and repeating steps k and l.

25. An apparatus for checking a gear assembly, comprising:
   means for retaining a gear assembly in a predetermined orientation with respect to a plane referenced to said means for retaining;
   means responsive to said gear assembly in a predetermined position with respect to said plane for generating a position signal;
   brake means for applying a brake load to said gear assembly to prevent rotation of at least one gear in said gear assembly;
   drive means for engaging an input of said gear assembly at a first predetermined speed of rotation of said drive means; and
   a controller having at least one input connected to said means responsive to said gear assembly for receiving said position signal, having a first output connected to said brake means for controlling the application of said brake load to said gear assembly, and having a second output connected to said drive means for controlling the speed of rotation of said gear assembly.

* * * * *